United States Patent
Kirkpatrick

[15] 3,685,053
[45] Aug. 15, 1972

[54] AREA NAVIGATION DISPLAY, PARTICULARLY FOR AIRCRAFT

[72] Inventor: George M. Kirkpatrick, Syracuse, N.Y.

[73] Assignee: Research Corporation, New York, N.Y.

[22] Filed: Sept. 4, 1970

[21] Appl. No.: 69,762

[52] U.S. Cl............343/106 R, 343/6 R, 343/112 PT
[51] Int. Cl..................................................G01s 1/50
[58] Field of Search...343/106 R, 112 PT, 5 EM, 6 R

[56] References Cited

UNITED STATES PATENTS

| 2,666,198 | 1/1954 | Wallace...........343/106 R UX |
| 3,130,401 | 4/1964 | Murphy..............343/106 R X |

*Primary Examiner*—Benjamin A. Borchelt
*Assistant Examiner*—Richard E. Berger
*Attorney*—Pennie, Edmonds, Morton, Taylor and Adams

[57] ABSTRACT

The display uses signals from standard VOR and DME receivers to produce a cathode-ray tube (CRT) display of distance and direction from a surface station. The constant amplitude sinusoidal reference VOR signal is multiplied by the DME distance signal and quadrature signals produced therefrom to deflect the CRT beam in a circular path synchronized with the reference signal and having a radius proportional to distance. The VOR variable phase direction signal is amplified, clipped and differentiated to yield intensifying pulses for the CRT display at an angle representing the direction of the aircraft from the surface station. If desired, the VOR variable phase direction signal could be multiplied by the DME distance signal to produce the circular path, if means are provided to hold the amplitude of the variable phase signal constant, and the reference VOR signal used to generate intensifying pulses.

3 Claims, 5 Drawing Figures

PATENTED AUG 15 1972

INVENTOR
George M. Kirkpatrick
BY
ATTORNEYS

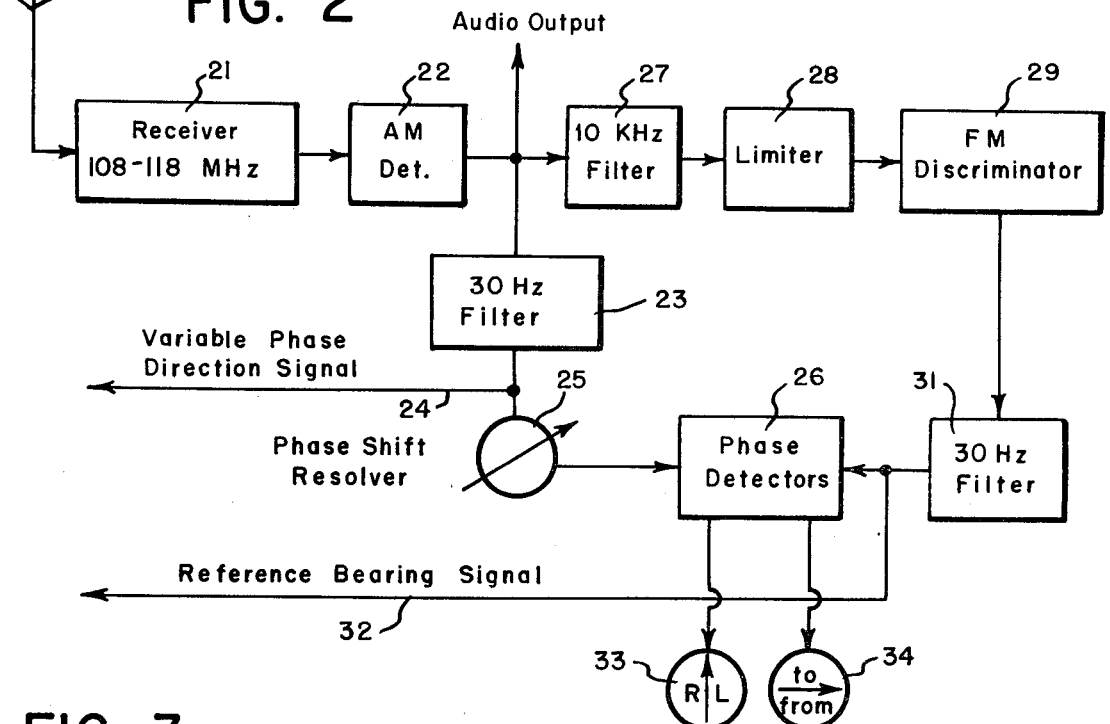
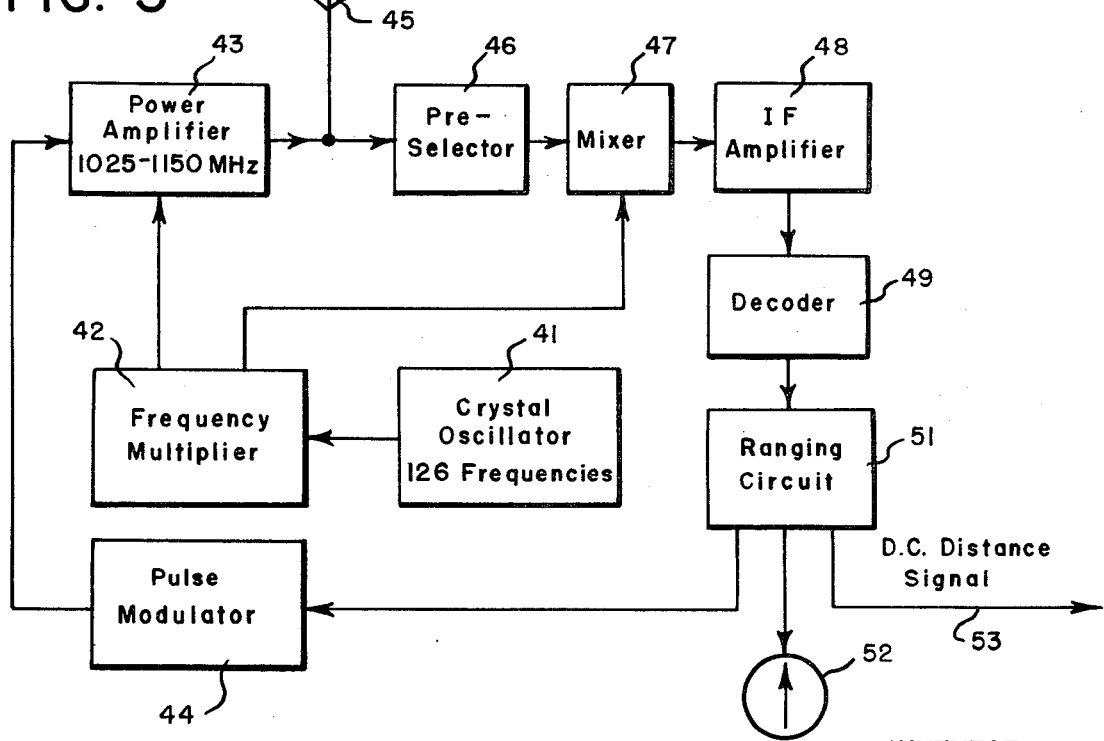

AREA NAVIGATION DISPLAY, PARTICULARLY FOR AIRCRAFT

BACKGROUND OF THE INVENTION

Various radio navigational aids are presently available to an aircraft pilot to give him information as to his direction and distance from a ground station, or more generally a surface station, and various types of display equipment have been used therewith. Some equipments give direction and distance separately, as by means of separate meters. Other equipments use electromechanical devices such as a cursor driven by a lead screw or string-pulley arrangement to give a display of both direction and distance.

Cathode-ray tube (CRT) displays of the PPI (Plan Position Indicator) type have also been suggested to simultaneously display azimuth and range by the use of radial sweeps suitably generated and controlled by the electronic signals.

At the present time VOR (Visual Omni Range) and DME (Distance Measuring Equipment) stations are in widespread use in the United States and most airplanes, including private planes, have suitable receiving equipment. Generally speaking, a VOR station transmits a rotating directional bearing signal and an omnidirectional reference bearing signal having a frequency equal to the frequency of rotation of the directional bearing signal. In the aircraft, the VOR receiver produces sinusodial reference and direction signals from the transmitted signals, the phase therebetween giving the angle of the aircraft from the ground station. The reference bearing signal is transmitted as a frequency-modulated signal, and the FM detector in the VOR receiver yields a constant-amplitude reference signal. The DME equipment involves a coded pulse transmission from the aircraft which is transponded (retransmitted) by the ground station. Ranging circuits in the aircraft receiver determine the overall time delay between transmission and reception, taking into account fixed delays introduced in the transponding, and yield a DC output signal which varies with the distance of the aircraft from the surface station.

It is a primary object of the present invention to provide a relatively simple, low-cost, all-electronic display system utilizing signals such as those available from conventional VOR and DME receivers to give the pilot an area navigational CRT display of his distance and direction from a VOR/DME surface station.

BRIEF SUMMARY OF THE INVENTION

In accordance with the invention, the constant-amplitude sinusoidal reference signal from the VOR receiver is multiplied by the distance signal from the DME receiver to produce a resultant sinusoidal signal whose amplitude varies with distance. Quadrature signals are produced from the resultant sinusoidal signal and applied to horizontal and vertical deflection circuits of a CRT display so as to produce a circular deflection for the display which is synchronized with the sinusoidal reference signal and which has a radius proportional to distance.

The variable phase signal from the VOR receiver is utilized to control the intensification of the CRT display so as to produce an indication at an angle representing the direction of the aircraft from the ground station. Conveniently, the sinusoidal directional signal is amplified, clipped and differentiated, and differentiated pulses of one polarity used to intensify the CRT display on each rotation of the circular deflection.

With the ground station centered on the CRT display, the intensified spot will show the distance and direction of the aircraft from the ground station. Bearing and distance indicia may be added to the display, or a transparent map overlay may be employed, so as to inform the pilot quickly and conveniently of his position over the terrain.

It is preferred to employ the reference signal from the VOR receiver in producing the circular deflection for the display, since conventional FM detectors maintain its amplitude quite constant. However, if desired, the functions of the reference and variable phase signals could be interchanged if suitable means are provided to hold the amplitude of the sinusoidal direction signal sufficiently constant.

Although specifically designed for use with VOR and DME equipment as presently known, the display can be used with other types of radio navigation systems yielding similar information in the aircraft. Also, although particularly designed for aircraft use, the display could be used in other types of mobile craft where similar information is available.

BRIEF DESCRIPTION OF THE DRAWINGS

FIGS. 2 and 3 are block diagrams of representative VOR and DME receivers;

DESCRIPTION OF THE SPECIFIC EMBODIMENT

Figure 1:
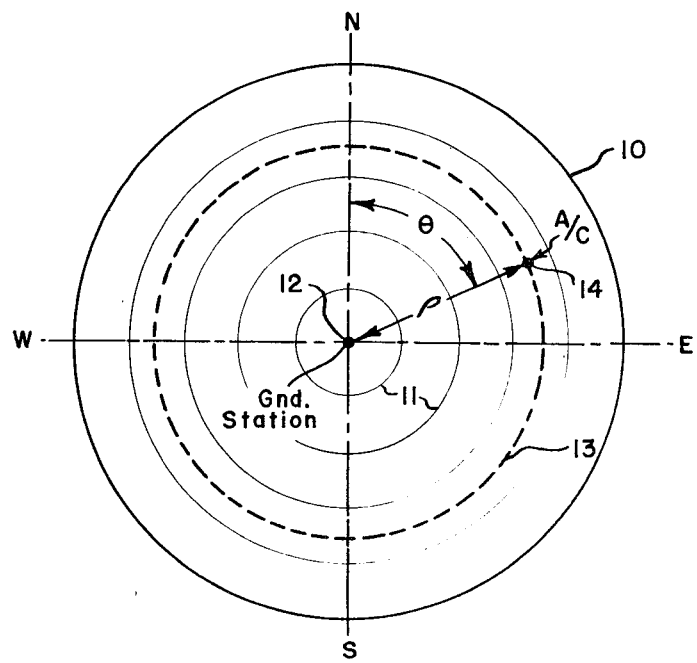
FIG. 1 illustrates a display produced by apparatus of the invention.

Referring to FIG. 1, the face of the CRT DISPLAY IS INDICATED AT -). Circles 11 illustrate various ranges, and may be drawn on an overlay. Or, a transparent map overlay may be used. The center 12 of the display represents the location of the ground station whose VOR and DME signals are being received. Dotted circle 13 indicates the circular deflection of the beam of the CRT at a radius proportional to the distance of the aircraft from the ground station, and may or may not be visible depending on the setting of the brightness control of the CRT. The radius of the circle is denoted $p$. An intensified spot 14 on circle 13, at an angle $\theta$ from the N (North) direction corresponds to the angle of the aircraft from the ground station. Suitable angle indicia may be added to the display if desired, as by means of a transparent overlay.

Thus, with suitable distance and angle indicia, the position of the intensified spot 14 gives the pilot his position relative to the ground station. If a map overlay is employed, spot 14 gives the pilot his position with respect to the terrain over which the aircraft is flying.

At a VOR ground station an RF carrier in, for example, the 108–118 MHz (megahertz) band is conventionally applied to a directional antenna having a cardioid pattern and rotating at 30 Hz. Thus, at any point in space the field strength varies sinusoidally at a frequency of 30 Hz, and its phase will depend on the direction from a specified direction, say North. The ground station also transmits a 30 Hz signal synchronized with the rotation of the cardioid antenna and of fixed phase relative to North. In practice, the RF carrier is applied to an omnidirectional antenna after it is amplitude-modulated by a 10 KHz tone that is frequency-modulated by the 30 Hz signal. Thus an aircraft at a given direction from the ground station will receive an RF signal which varies sinusoidally in amplitude with a phase depending on the direction, and also is modulated by the reference signal.

Referring to FIG. 2, a representative example of a conventional VOR receiver is illustrated. The transmitted signal is tuned in by receiver 21 and AM detected in 22. The directional bearing signal component is selected by filter 23, thus yielding a sinusoidal direction signal in line 24 of variable phase depending on the direction of the aircraft from the ground station. The direction signal is fed through a phase shift resolver 25 to phase detectors 26. The 10 KHz modulation is selected by filter 27 and fed through limiter 28 to FM discriminator 29. The discriminator output is supplied to filter 31, thereby yielding a sinusoidal reference signal of constant amplitude in line 32. The reference signal is supplied to phase detectors 26.

The difference in phase between the variable phase and reference signals in lines 24 and 32 gives the angle of the aircraft from the reference angle, due North. Resolver 25 enables the pilot to phase shift the direction signal, as applied to phase detectors 26, so that he can select his desired angle of flight from (or to) the ground station. Meter 33 will then indicate deviations from the desired course. Meter 34 informs the pilot whether he is travelling toward or away from the ground station.

FIG. 3 illustrates a representative example of DME equipment carried in the aircraft. The output of a selectable frequency crystal oscillator 41 is frequency multiplied in 42 to provide a desired RF carrier frequency, and the carrier supplied to power amplifier 44. Pulse pairs produced by pulse modulator 44 modulate the carrier in amplifier 43 and the modulated carrier is transmitted by antenna 45. At the ground station the pulse pairs are retransmitted by a transponder, after a predetermined delay, on a carrier frequency spaced above or below the original transmitter frequency by a predetermined amount, say 63 MHz. The transponded signals from the ground are received by antenna 45 and fed through preselector 46 to mixer 47. An appropriate frequency from multiplier 42 is fed to mixer 47 to yield the desired IF frequency of 63 MHz.

The IF frequency is fed through amplifier 48 to decoder 49 which confines reception to pulse pairs having the same spacing as those transmitted. These are supplied to a ranging circuit 51. Initially the ranging circuit is in a search mode and pulse pairs are transmitted at a higher PRF (pulse recurrence frequency) of say 150 pulse pairs per second. A ranging gate moves slowly outward from zero miles to the maximum range until several pulse pairs of consistent time delay are received, whereupon the ranging circuit changes to its tracking mode. In the tracking mode the PRF of the transmitted pulse pairs is reduced and a DC output indicates the position of the tracking gate and varies proportionally to the distance from the ground station. The DC output actuates meter 52. For the display of the present invention, the DC output is taken from a suitable point in the ranging circuit and is supplied to output line 53.

VOR and DME equipments are well known, and it is believed that the above general description will suffice for purposes of explaining the present invention.

Figure 4:
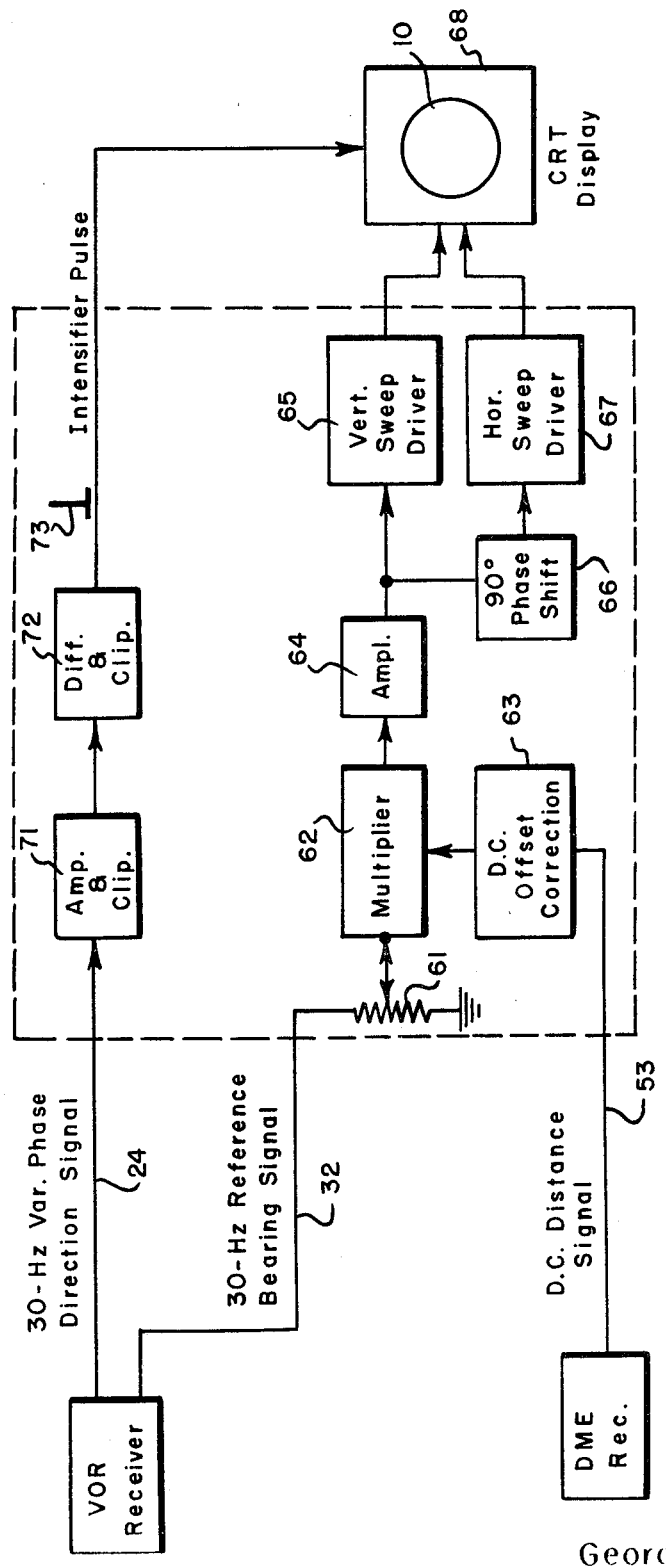
FIG. 4 is a block diagram of display apparatus in accordance with the invention.

Referring now to FIG. 4, the constant amplitude 30 Hz reference bearing signal in line 32 of FIG. 2 is fed through a gain control circuit, here illustrated as potentiometer 61, to a multiplier 62. The DC distance signal in line 53 of FIG. 3 is also fed to multiplier 62. Commonly the output of a DME receiver will not be zero for zero distance, and accordingly a DC offset correction is supplied by circuit 63. The offset correction may be produced by a battery, a Zener-controlled power supply, etc. so as to add or subtract a voltage from the signal in line 53 which will yield a signal to multiplier 62 which is zero for zero distance.

In multiplier 62 the constant-amplitude sinusoidal reference bearing signal is multiplied by the DC distance signal to give a sinusoidal signal whose amplitude varies with distance. Suitable multipliers are known in the art.

Quadrature signals are developed from the multiplier output so as to deflect the beam of the CRT display in a circle whose radius is proportional to distance. Various circuits are known for producing such quadrature signals. As here illustrated, the output of the multiplier 62 is fed through amplifier 64 to a vertical sweep driver 65 for the CRT display. The output of amplifier 64 is also fed through a 90° phase shift circuit 66 to a horizontal sweep driver 67. Hence the outputs of drivers 65 and 67 will be in phase quadrature and will deflect the beam of the CRT display 68 in a circle whose radius is proportional to distance of the aircraft from the ground station. A gain control may be provided in either driver 65 or 67, or both, to equalize horizontal and vertical deflection components to produce a true circle.

The variable phase direction signal in line 24 of FIG. 2 is supplied to an amplifier and clipper circuit 71 which converts the sine wave to a square wave. The square wave is supplied to a differentiator and clipper circuit 72 which produces short differentiated pulses at the leading and trailing edges of the square wave, and selects pulses of one polarity, say positive. One such pulse is shown at 73, and is applied to the CRT display to intensify the beam.

If there is excessive noise in the 30 Hz signals from the VOR receiver, filter or equivalent circuits may be introduced in the path of the signals to the apparatus of FIG. 4 so that sufficiently noise-free signals are supplied to multiplier 62 and amplifier-clipper 71.

Figure 5:
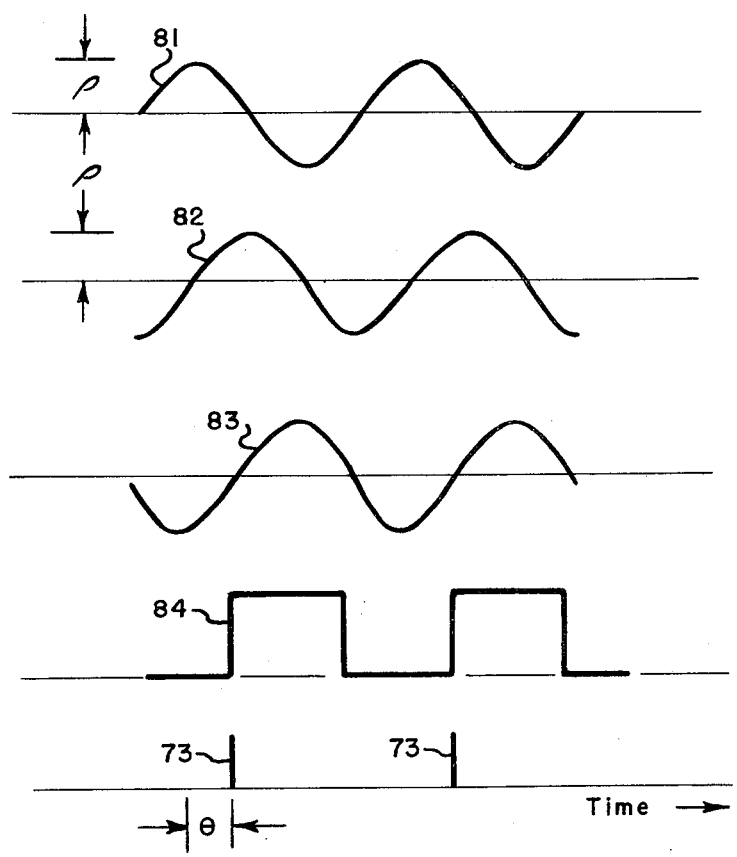
FIG. 5 shows waveforms applicable to FIG. 4.

Referring to FIG. 5, sinusoidal waves 81 and 82 represent the quadrature waves applied applied to the vertical and horizontal deflection coils (or plates) of the CRT display 68, the amplitudes being proportional to distance $p$. Sinusoidal wave 83 represents the direction signal in line 24, and square wave 84 is produced therefrom. The leading edges yield the positive differentiated pulses 73 which form the intensifier pulses. As will be observed, one intensifier pulse 73 is produced for each cycle of the direction signal 83 and the pulses are at a fixed angle in respective cycles, here at the zero crossover points where the slope is positive. Inasmuch as deflection waves 81 and 82 are produced from the received reference bearing signal, they will be synchronized therewith. Hence, if the positive peaks of wave 81 correspond to due North, pulses 73 will occur at angle θ to due North, as indicated.

Suitable phase shifts may be introduced as required to take into account the phases of the inputs to the display apparatus of FIG. 4, and any phase shift occurring in the apparatus, as will be understood by those skilled in the art. If a 90° phase shift in the display is required, the connections from drivers 65 and 67 to the CRT display may be interchanged.

If map overlays are employed, the scale of the circular deflection should match the map scale. The deflection scale can be adjusted by changing the gain for the reference signal or distance signal as supplied to multiplier 62, or the gain of amplifier 64, etc. Here the gain of the reference signal is adjustable by potentiometer 61.

Conventionally the DME output is proportional to slant range. This may be sufficiently accurate for practical purposes, since slant and horizontal ranges are approximately the same for moderate altitudes except when the aircraft is nearly over the ground station. However, if desired the slant range could be converted to horizontal range by using aircraft altitude, as is known in the art, and the horizontal range signal used as the distance signal applied to the multiplier of FIG. 4.

Inasmuch as the phase between the reference and directional signals is relative, it is possible to interchange the signals applied to lines 24 and 32 of FIG. 4. In such case the amplitude of the variable phase direction signal as applied to line 32 would need to be held constant, that is, independent of distance, propagation conditions, etc., as by suitable automatic gain control means, so that when the signal is multiplied by the distance signal the resultant amplitude will represent distance sufficiently accurately.

I claim:

1. A navigation display system in a mobile craft for displaying distance and direction from a surface station,
   a. said surface station transmitting a rotating directional bearing signal and an omnidirectional reference bearing signal having a frequency equal to the frequency of rotation of the directional bearing signal,
   b. said mobile craft having receiving means for producing from said reference bearing signal a reference signal of predetermined fixed phase relative thereto and producing from said directional bearing signal a variable phase signal whose phase with respect to said reference signal varies in accordance with the direction from said surface station,
   c. at least one of said reference and variable phase signals produced by said receiving means being sinusoidal and of constant-amplitude, and
   d. said surface station and mobile craft including distance measuring equipment for producing in said mobile craft a distance signal varying with the distance of the mobile craft from the surface station, said navigation display system comprising
   e. a cathode-ray tube display including horizontal and vertical deflection circuits and a beam intensification circuit,
   f. means for multiplying one of said reference and variable phase signals which is sinusoidal and of constant amplitude by said distance signal to produce a resultant sinusoidal signal whose amplitude varies with distance,
   g. means for producing quadrature signals from said resultant sinusoidal signal,
   h. means for applying said quadrature signals to said deflection circuits to produce a circular deflection for said cathode-ray tube display synchronized with said constant-amplitude sinusoidal signal and having a radius proportional to distance,
   i. and means for utilizing the other of said reference and variable phase signals to control said beam intensification circuit to produce an indication at an angle representing the direction of the mobile craft from the surface station.

2. A navigation display system in a mobile craft for displaying distance and direction from a surface station,
   a. said surface station transmitting a rotating directional bearing signal and an omnidirectional reference bearing signal having a frequency equal to the frequency of rotation of the directional bearing signal,
   b. said mobile craft having receiving means for producing from said reference bearing signal a constant-amplitude sinusoidal reference signal of predetermined fixed phase relative thereto and producing from said directional bearing signal a variable phase signal whose phase with respect to said sinusoidal reference signal varies in accordance with the direction from said surface station, and
   c. said surface station and mobile craft including distance measuring equipment for producing in said mobile craft a distance signal varying with the distance of the mobile craft from the surface station, said navigation display system comprising
   d. a cathode-ray tube display including horizontal and vertical deflection circuits and a beam intensification circuit,
   e. means for multiplying said constant-amplitude sinusoidal reference signal and said distance signal to produce a resultant sinusoidal signal whose amplitude varies with distance
   f. means for producing quadrature signals from said resultant sinusoidal signal,
   g. means for applying said quadrature signals to said deflection circuits to produce a circular deflection for said cathode-ray tube display synchronized with said sinusoidal reference signal and having a radius proportional to distance,
   h. and means for utilizing said variable phase signal to control said beam intensification circuit to produce an indication at an angle representing the direction of the mobile craft from the surface station.

3. A navigation display system in an aircraft for displaying distance and direction from a surface station,
   a. said surface station transmitting a rotating directional bearing signal and a frequency-modulated omnidirectional reference bearing signal having a modulation frequency equal to the frequency of rotation of the directional bearing signal, b. said aircraft having receiving means for producing from said frequency-modulated reference bearing signal a constant-amplitude sinusoidal reference signal of predetermined fixed phase relative thereto and producing from said directional bearing signal a sinusoidal direction signal whose phase with respect to said sinusoidal reference signal varies in accordance with the direction from the surface station, c. said aircraft having pulse transmitting and ranging equipment and said surface station having pulse transponding equipment cooperating to produce in the aircraft a DC distance signal varying with the distance of the aircraft from the surface station, said navigation display system comprising d. a cathode-ray tube display including horizontal and vertical deflection circuits and a beam intensification circuit, e. means for multiplying said constant-amplitude sinusoidal reference signal and said DC distance signal to produce a resultant sinusoidal signal whose amplitude varies with distance, f. means for producing quadrature signals from said resultant sinusoidal signal, g. means for applying said quadrature signals to said deflection circuits to produce a circular deflection for said cathode-ray tube display synchronized with said sinusoidal reference signal and having a radius proportional to distance, h. means for producing from successive cycles of said sinusoidal direction signal respective pulses at a fixed angle in the respective cycles, i. and means for utilizing said pulses to control said beam intensification circuit to produce an indication at an angle representing the direction of the aircraft from the surface station.

* * * * *